(12) United States Patent
Fabis

(10) Patent No.: US 10,221,872 B2
(45) Date of Patent: *Mar. 5, 2019

(54) RIGID FOAM BOARD INSTALLATION CLIP

(71) Applicant: Paul Fabis, Westmoreland, NH (US)

(72) Inventor: Paul Fabis, Westmoreland, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/920,883

(22) Filed: Mar. 14, 2018

(65) Prior Publication Data

US 2018/0216641 A1    Aug. 2, 2018

Related U.S. Application Data

(63) Continuation of application No. 15/254,675, filed on Sep. 1, 2016, now Pat. No. 9,945,403, which is a continuation-in-part of application No. 14/967,607, filed on Dec. 14, 2015, now Pat. No. 9,458,625, which is a continuation of application No. 14/623,108, filed on Feb. 16, 2015, now Pat. No. 9,243,400, which is a continuation of application No. 14/195,110, filed on Mar. 3, 2014, now Pat. No. 8,955,280.

(60) Provisional application No. 61/851,138, filed on Mar. 4, 2013.

(51) Int. Cl.
| | |
|---|---|
| *F16B 2/14* | (2006.01) |
| *E04B 1/80* | (2006.01) |
| *F16B 2/12* | (2006.01) |
| *E04B 1/76* | (2006.01) |
| *E04B 9/30* | (2006.01) |
| *E04B 9/36* | (2006.01) |
| *E04B 1/38* | (2006.01) |
| *E04B 1/61* | (2006.01) |

(52) U.S. Cl.
CPC .............. *F16B 2/14* (2013.01); *E04B 1/7675* (2013.01); *E04B 1/80* (2013.01); *E04B 9/30* (2013.01); *E04B 9/366* (2013.01); *F16B 2/12* (2013.01); *E04B 1/6112* (2013.01); *E04B 2001/405* (2013.01)

(58) Field of Classification Search
CPC .. F16B 2/14; F16B 2/12; E04B 1/7675; E04B 9/30; E04B 1/80; E04B 2001/405; E04B 1/6112

See application file for complete search history.

(56) References Cited

U.S. PATENT DOCUMENTS

| | | | |
|---|---|---|---|
| 3,218,771 A | 11/1965 | Horn | |
| 3,359,697 A | 12/1967 | Smith et al. | |
| 3,425,568 A * | 2/1969 | Albright | A47B 97/001 211/169 |
| 3,969,865 A * | 7/1976 | Andersen | E04B 9/068 52/506.07 |
| 4,257,204 A | 3/1981 | Rieger | |
| 4,287,839 A | 9/1981 | Severin et al. | |
| 4,495,741 A | 1/1985 | Pasiecznik | |

(Continued)

*Primary Examiner* — Jeanette E Chapman

(74) *Attorney, Agent, or Firm* — Lambert Shortell & Connaughton; Gary E. Lambert; David J. Connaughton, Jr.

(57) ABSTRACT

A clip for facilitating installation of foam insulation boards in a building structure. The clip comprises a body, a spacer and a foot for holding the insulation board, and a connection region for attachment of the clip to a building structural member. The clip is designed to ensure proper ventilation and greatly easy the proper installation of rigid foam insulation.

20 Claims, 3 Drawing Sheets

(56) References Cited

U.S. PATENT DOCUMENTS

| | | | | |
|---|---|---|---|---|
| 4,720,946 | A * | 1/1988 | Pagliarello | E04B 9/22 52/127.7 |
| 4,855,873 | A * | 8/1989 | Bhargava | H05K 7/142 174/138 D |
| 4,948,312 | A * | 8/1990 | Jochum | F16B 19/14 408/202 |
| 5,834,891 | A * | 11/1998 | Novich | H01J 9/185 313/495 |
| 6,205,733 | B1 * | 3/2001 | LaLonde | E04B 9/067 52/506.07 |
| 7,017,317 | B2 * | 3/2006 | Capozzo | E04B 9/0478 52/127.12 |
| 7,818,935 | B2 * | 10/2010 | Velickovic | E04B 2/8652 24/573.11 |
| 8,875,467 | B2 * | 11/2014 | Anastasi | E04F 13/0807 52/379 |
| 9,447,584 | B2 * | 9/2016 | Farahmandpour | E04F 13/00 |
| 9,670,674 | B2 * | 6/2017 | St-Laurent | E04B 9/22 |
| 2005/0217196 | A1 | 10/2005 | Fogg | |
| 2009/0056255 | A1 | 3/2009 | Barton | |

* cited by examiner

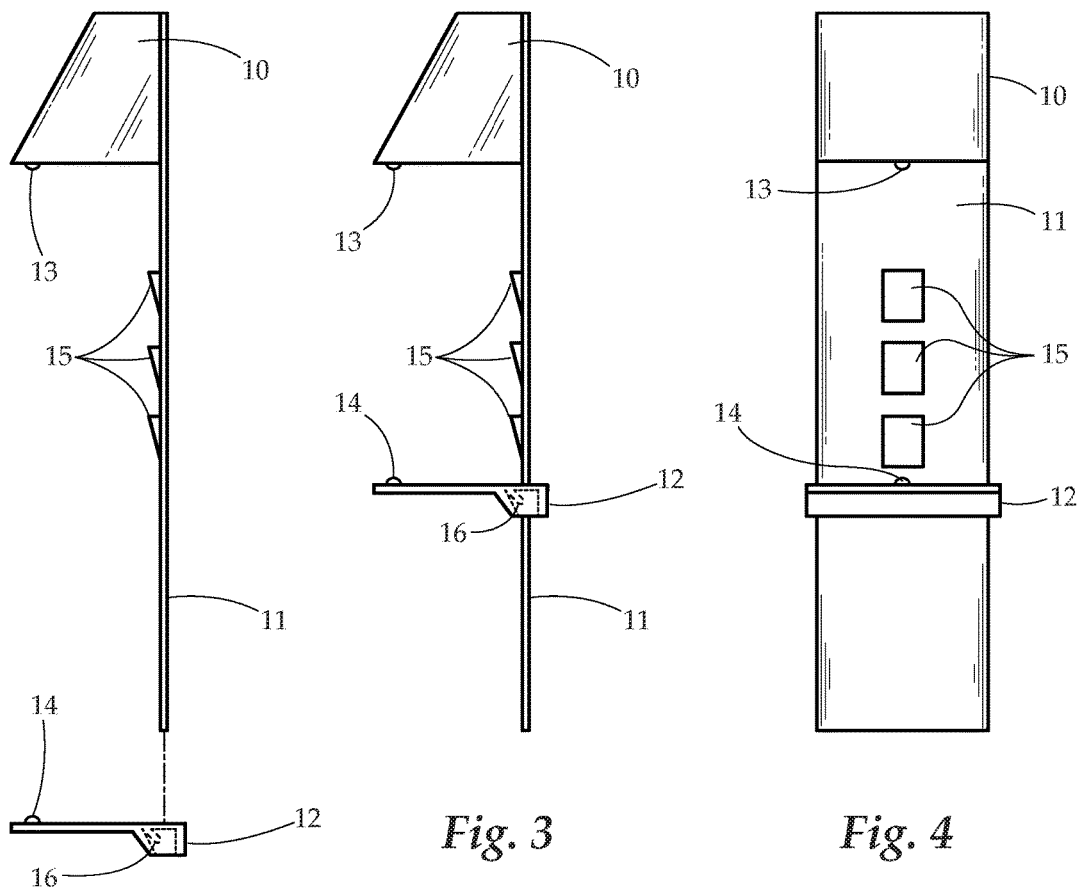
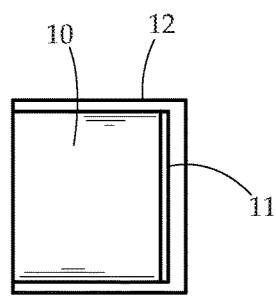
Fig. 5
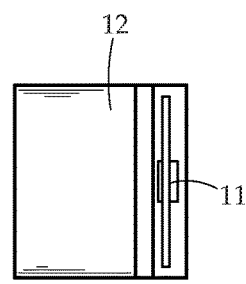
Fig. 6

RIGID FOAM BOARD INSTALLATION CLIP

BACKGROUND OF THE INVENTION

Field of the Invention

The present invention relates generally structural connectors. More particularly, the present invention relates to a clip for attaching rigid foam insulation to a building's structural members.

Description of Related Art

The need for properly installed and correctly located insulation is not easily met using current construction practices. Rigid foam insulation board (sometimes referred to as RFB) is, in present common practice, supported by strips of lath (nailers) nailed to the rafters, joists, or beams between which the insulation board is to be installed. Supporting the insulation board while attaching the nailers is difficult, especially if the spacing between the rafters, joists, or beams is insufficient to swing a hammer. Further, precise placement of the nailer is difficult. As such, current practices utilize excess material and require extensive labor in the milling and installing processes to properly install the rigid foam insulation board. This difficulty can in some cases lead to injury because of the difficult maneuvers being performed on ladders and in off-balance positions. Further, precise workmanship of the task is very time consuming and costly. The current products available for providing roof ventilation do not provide a fully vented space. This lack of venting restricts air flow, and promotes moisture entrapment which results in potential ice damming, poor indoor air quality and early deterioration of roof sheathing and roofing.

Therefore, what is needed is a more efficient structure and method of installing rigid foam insulation board.

SUMMARY OF THE INVENTION

The subject matter of this application may involve, in some cases, interrelated products, alternative solutions to a particular problem, and/or a plurality of different uses of a single system or article.

In one aspect, a rigid foam insulation board installation clip is provided. The clip comprises a body having a spacer at its distal end, and a connection region at its proximal end. The spacer has a top and a bottom, and has at least a portion of the bottom extending approximately perpendicularly from the body. The clip further comprises a foot, the foot may be fixed, or may be adjustably positionable along the body at a distance away from the spacer. The spacer and foot, when properly positioned, define a cavity between them, the cavity defined at a top and bottom by the spacer and foot, respectively, having an open front and sides, and a rear defined by the body.

In another aspect, a foam insulation assembly is provided. The insulation assembly comprises a building structural member, and a foam insulation board connected thereto by a clip. The clip comprises a body having a connection region, a spacer extending from a distal end of the body, and a foot. The foot may be fixed, or may be adjustably positionable along the body at a distance away from the spacer. The spacer and foot, are oriented to hold the insulation board in place with a spacer bottom abutting one side of the insulation board, and the foot abutting the opposite side of the insulation board. The connection region of the clip is attached to the building structural member. The top of the spacer abuts a sheathing or similar building structure, thereby forming an air space gap between the sheathing and the foam insulation.

BRIEF DESCRIPTION OF THE DRAWINGS

FIG. 2 provides a side view of an embodiment of the installation clip.

FIG. 3 provides a side view of another embodiment of the installation clip.

FIG. 4 provides a front view of an embodiment of the installation clip.

FIG. 5 provides a top view of an embodiment of the installation clip.

FIG. 6 provides a bottom view of an embodiment of the installation clip.

DETAILED DESCRIPTION

Figure 1:
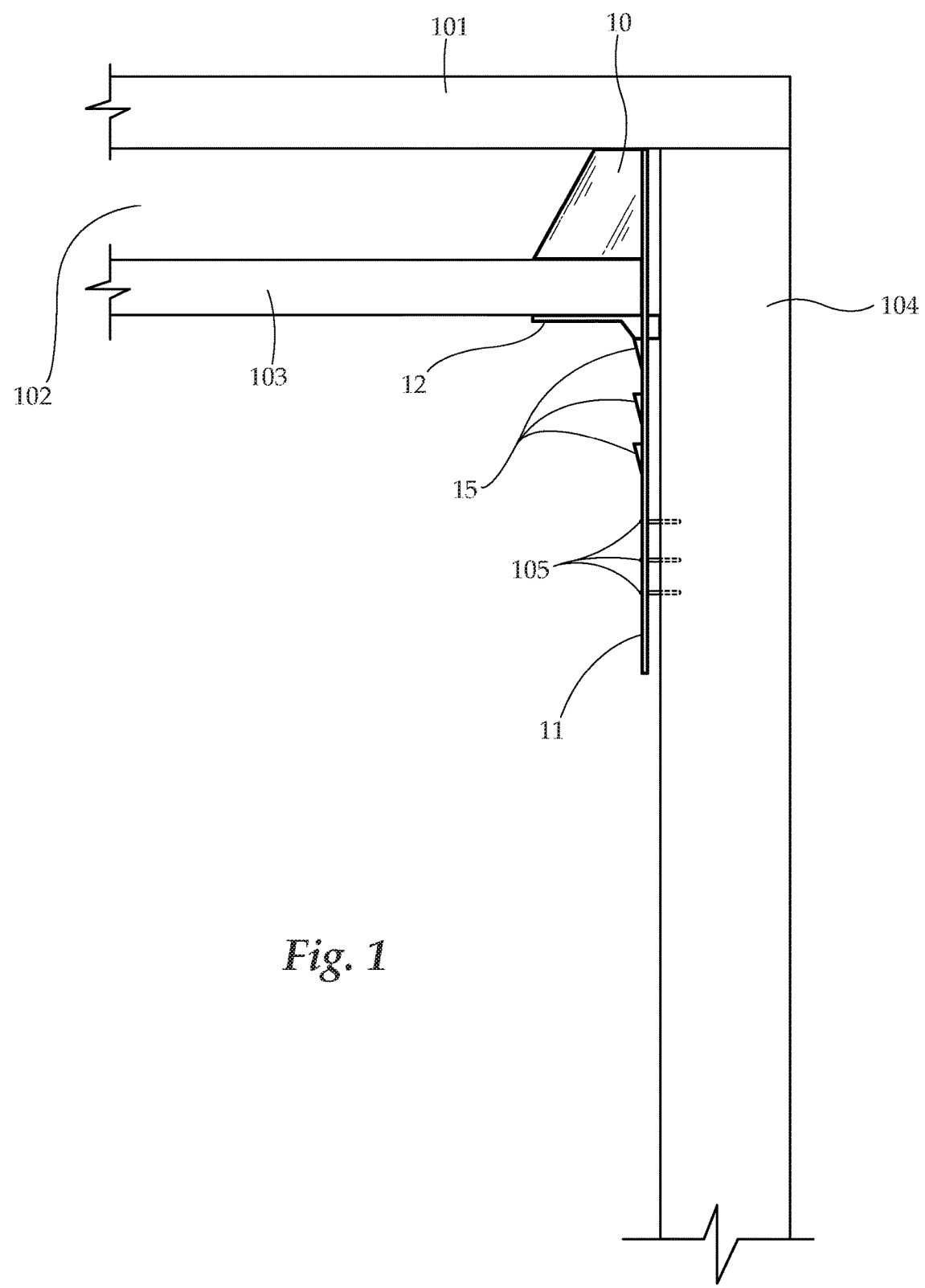
FIG. 1 provides a side view of an embodiment of the installation clip in use.
Figure 7:
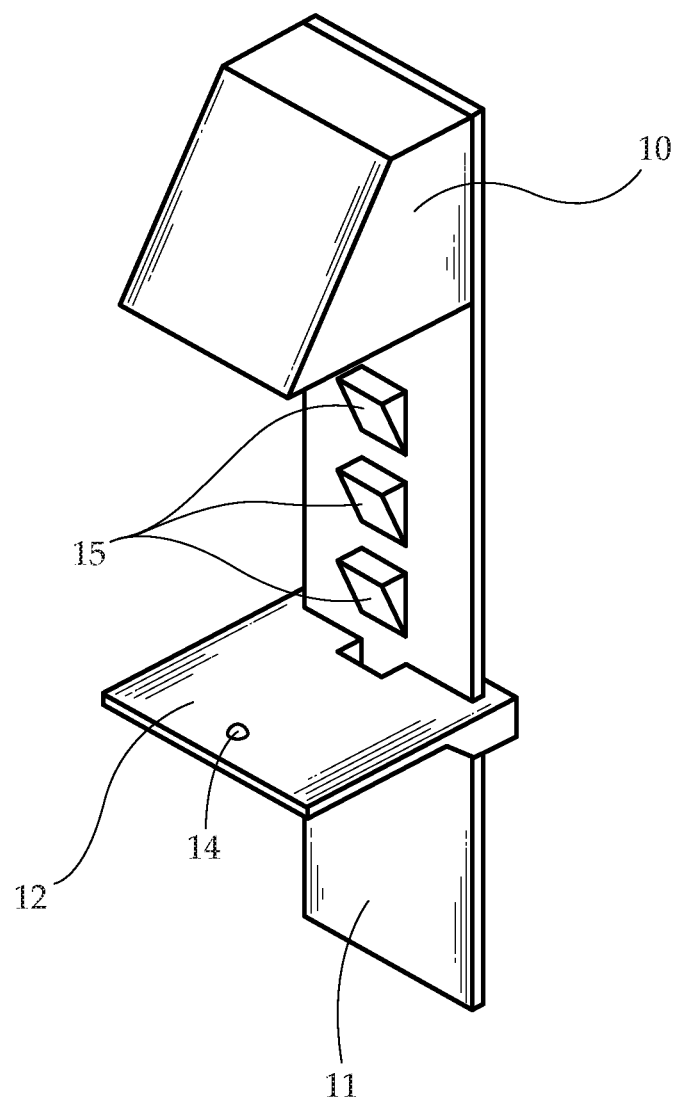
FIG. 7 provides a front perspective view of an embodiment of the installation clip.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a clip that may be attached to rigid foam board insulation for building insulation, the clip is also configured to be attachable to building structural members. As such, the installation of rigid foam insulation is greatly facilitated. The present clip invention may be used in any condition where rigid foam insulation is being installed. For example, the clip may be used in new construction, existing buildings, renovations, and the like.

The clip consists of a spacer configured to provide an air spacing between a sheathing or flooring and the insulation when installed. The clip further comprises a foot portion, the foot portion configured to pinch or otherwise secure the foam insulation between it and the spacer. A body of the clip may extend downwards away from the spacer and foot. This body is designed to be attached to a building framing or other structural member, allowing the foam insulation board to which the clip is attached to be secured in place, and properly spaced from the sheathing. The foot in many embodiments may be slidable along the clip body allowing the clip to be adjustable for various insulation board thicknesses. However, it should be understood that the foot may be in any configuration allowing it to secure the insulation board between it and the spacer. For example the foot may screw into place, may flip into place, or may be connectable to the body once the insulation board is placed adjacent to the spacer.

The installation clip contemplated herein is configured to accept multiple differently sized foam insulations. For example, the most commonly sized insulations have thicknesses of ½ inch, 1 inch, and 1½ inch. As such, in one embodiment, the clip may be adjustable to three distinct positions to accept these three sizes. In further embodiments, the clip may be adjustable to accept other sizes of foam board insulation. This adjustability is shown herein by adjustment of the foot portion of the clip. However, it should be understood that the adjustability may be achieved in other ways without straying from the scope of the present invention.

The installation clip contemplated herein may be formed of any material rigid enough to connect to and support the foam insulation board, and resilient enough to be attached to the building structural members. For example, materials of which the installation clip may be made include, but are not limited to, hard plastics, wood, metals, composite materials, ceramics, combinations thereof, and the like.

The installation clip may be any size capable of connecting to and supporting the foam insulation board. Size may vary depending on application, and it should be understood that the sizing of the clip is in no way limited based on the disclosure herein.

The clip may be attached to the building structural members (rafters, joists, beams, etc.) in any manner capable of supporting the insulation. For example, the clip may be mechanically connected to the structural members by fasteners such as nails, staples, screws, tacks, and the like. In other embodiments, adhesives, pressure connections, and the like may be employed.

Turning now to FIG. 1, an embodiment of the installation clip in use is shown. A foam insulation board 103 is shown secured between a sail-shaped spacer 10 and a foot 12. The spacer 10 abuts a sheathing (of sub-flooring, roofing, or the like) 101 at its top, abuts a foam insulation board 103 at its bottom, and is sized to provide an air space 102 between the insulation board 103 and sheathing 101. The spacer 10 is shown here as a trapezoid, having a front face sloping inwards from the bottom to the top, the bottom of the spacer extending further from the body than the top. However, the spacer could be of any shape without straying from the scope of the present invention.

When thoroughly installed, the spacer 10 ensures that there is a uniform depth of air space between the insulation board 103 and sheathing 101. Foot 12 is configured to be slidable or otherwise positionable along the length of the clip body 11. In this embodiment, the foot 12 may be slid upward, but once it passes each ramp 15, it can no longer slide downwards past it. In this embodiment, the ramps 15 allow the foot 12 to stay in place once it is securing the insulation board 103. The foot 12 may have a tab that can be urged up by the ramps 15 and then snaps back into place once it passes over the ramp, thereby preventing the foot 12 from passing back over the ramp 15. In the embodiment shown, the ramps 15 are specifically spaced so that the clip can receive a 1½ inch thick board, a 1 inch board, and a ½ inch thick board.

The body 11 of the clip forms an elongate strip that extends downward from where the spacer 10 and foot 12 secure the insulation board 103. This extending strip is configured as a connection region to be attached to the building structural members to thereby secure the clip and insulation in place. In the embodiment shown, the body 11 is attached to framing 104 by a plurality of staples 105. As noted above, this connection could be made in any way suitable to attach the body 11 to framing 104.

In other embodiments, the foot 12 may be prevented from moving downwards away from the spacer 10 in a number of alternative ways. For example, instead of the three large ramps 15 shown in FIG. 1, a plurality of small ramps may allow adjustment of the foot 12 in smaller increments upward toward the spacer 10, while still preventing downwards movement of the foot 12. In another embodiment, a threaded connection may allow the foot 12 to move closer to the spacer 10 while limiting its movement away from the spacer 10.

The spacer 10 is shown in FIG. 1 as being sail shaped, but it should be understood that it may take any shape capable of extending over a portion of the foam insulation board 103 and spacing this connecting area away from a sheathing or other surface that abuts a top of the spacer 10.

FIGS. 2-7 show another embodiment of the clip in an open position. The clip has an elongate body 11 with a spacer 10 at a distal end. The spacer 10 extends away from the body 11 and is configured to hold an insulation board between it and a foot 12. A bump shaped protrusion 13 extends from a bottom surface of the spacer 10, the protrusion 13 may aid in securing the clip to the foam insulation board (not shown). A foot 12 is shown at a proximal end of the body 11. This foot 12 is slidable along the body 11. A tab 16 extends into a sliding aperture defined by the foot 12 allowing the foot 12 to slide along the body 11. The tab is configured to flex or slide over ramps 15 as the foot 12 is slid upward along the body 11 toward the spacer 10. Once the foot 12 passes over each ramp 15, the angle of the tab 16 prevents it from moving back downward. This may aid in the clip holding on to the insulation board. The foot 12 also has a bump shaped protrusion 14. This protrusion 14 is configured to hold the insulation board tightly. In some embodiments, the clip body 11 and foot 12 may be separate, and the foot 12 may be installed on the body 11 during a process wherein the clips are being attached to the foam insulation board.

As further shown in FIGS. 2 and 3, the foot 12 is positionable along the body 11 at a distance away from the spacer 10 such that the foot 12 and the bottom of the spacer 10 define a cavity between them, the cavity having an open front and sides, and a rear defined by the body 11.

The installation clip described herein may be used in any number of manners to secure to foam board insulation and be attached to building structural members. Generally, the steps involved include cutting or otherwise obtaining a properly sized foam insulation board, connecting the foot to the clip body (if not already attached), placing a bottom face of the spacer, which extends from the clip body, against a piece of the rigid foam board insulation, sliding the foot upward towards the spacer until it abuts an opposing face of the insulation, thus connecting the clip to the insulation, and attaching the clip body to a building structural member. In varying embodiments, the step order may vary, and certain steps may be added or omitted.

In one embodiment, a piece of foam board insulation may have the clips attached at varying intervals initially at a ground level-forming a pre-clipped insulation board. In a particular embodiment, these intervals may correspond to intervals of the framing or other structural member to which the clips will be attached. In another particular embodiment, the clips may be placed at two-foot intervals. Typically, the clips will be attached on the longitudinal edges of the foam insulation board. This pre-clipped insulation board can then be easily moved so an installer, who may be at ground level, on a ladder, or otherwise at elevation. The installer can then easily position the insulation to ensure proper spacing from the sheathing or the like because of the spacers. Further, once positioned, the installer can easily secure the insulation in place by stapling or otherwise securing the clip bodies to adjacent structural members.

In another embodiment, the installer may connect the clips to the insulation boards as the board is being installed. In still another embodiment, the clips may be connected to the structural members first, and then the foam insulation board may be put in place and connected to the clips by sliding the foot into a securing position.

In many cases, gaps are created between the foam insulation boards and the rafters, joists, beams, or the like, to which the insulation boards have been attached. These gaps may be sealed in any manner. In one embodiment, the gaps may be sealed with beads of foam sprayed to bridge these gaps. Framing with irregular centers, or those centers out of parallel may require individual measuring and cutting of the insulation board to fit each location. However, even in such cases, the clips described herein may still be utilized, and the clips may be positioned specifically based on the configuration of the irregular space.

In further embodiments, the present invention may enhance the operation of radiant floor heating. The use of the installation clips described herein will result in uniform distance of air space between the insulation board and the surface beneath which it is suspended. The clips can be used horizontally beneath sub-floor and radiant tubing to attach the insulation boards between floor joists. This uniform distance of air space may provide for consistence spacing of radiant heating components beneath a sub-flooring and may achieve a more uniform floor temperature during the heating season.

Moreover, in some embodiments, the present invention may enhance roof ventilation and insulation. The current standard method for roof ventilation is attached to the roof deck itself and does not allow a fully ventilated cavity, which may introduce ice damming among other problems. This standard method has no structural integrity and will only allow a loose fill insulation be used to fill the remainder of the cavity as opposed to the foam board insulations with clips taught herein which allows for a dense pack insulation to be used. Thus the present invention just allows for a maximized insulating value without the danger of ice damming. Although there are many roof ventilation methods, there are none that provide the ventilation as described in the use of the clips taught herein. Specifically, the use of the installation clips provide ventilation vertically at heels of rafters or roof trusses. Further they allow adequate air sealing and blocking for the remainder of the cavity to be filled with dense pack cellulose or another type of insulation to provide a desired insulation value. Further still, in some embodiments, the clips may be used beneath a roof deck. Further, the vertical installation of the clips and panels when installed at the heels of roof rafters and trusses are important to conforming to the national energy code for insulating over exterior wall plates.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth. Further, while the clip is described herein as being configured for a foam insulation board, it should be understood that the clip may be used to hold any board or similar elongate element.

What is claimed is:

1. A foam insulation board installation clip comprising:
    a body, the body having a connection region, the body being mountable to a building structural member;
    a spacer extending from a distal end of the body, the spacer having a top and a bottom, and a spacing height between the top and the bottom, the top of the spacer being a terminal end of the distal end of the clip, wherein the bottom is oriented approximately perpendicular to the body, and is spaced apart from the top, wherein the top is approximately perpendicular to a rear face of the body, such that the top and the bottom are approximately parallel;
    a foot, the foot being positioned along the body at a distance away from the spacer such that a top of the foot, a front face of the body, and the bottom of the spacer define a cavity, the cavity having an open front and sides, a top of the cavity defined by the bottom of the spacer, a bottom of the cavity defined by a top of the foot, and a rear of the cavity defined by the front face of the body.

2. The foam insulation board installation clip of claim 1 wherein the foot protrudes laterally away from the front face of the body.

3. The foam insulation board installation clip of claim 1 wherein the spacer protrudes laterally away from the front face of the body.

4. The foam insulation board installation clip of claim 2 wherein the spacer protrudes laterally away from the front face of the body to a distance away from the body that is approximately equal to a distance that the foot protrudes away from the body.

5. The foam insulation board installation clip of claim 1 wherein the foot is fixedly connected to the body.

6. The foam insulation board installation clip of claim 1 wherein the connection region is positioned on a part of the body that is on an opposite side of the foot from the spacer.

7. A foam insulation assembly comprising:
    a foam insulation board;
    a building structural member, the foam insulation board being connected to the building structural member by a clip, the clip comprising:
        a body, the body having a connection region;
        a spacer extending from a distal end of the body, the spacer having a top and a bottom, the bottom spaced apart from the top, the top of the spacer being a terminal end of the distal end of the clip, wherein the bottom is oriented approximately perpendicular to the body, and is spaced apart from the top, wherein the top is approximately perpendicular to a rear face of the body, such that the top and the bottom are approximately parallel;
        a foot, the foot being positioned along the body at a distance away from the spacer such that a top of the foot, a front face of the body, and the bottom of the spacer define a cavity, the cavity having an open front and sides, a top of the cavity defined by the bottom of the spacer, a bottom of the cavity defined by a top of the foot, and a rear of the cavity defined by the front face of the body;
    the foam insulation board being positioned within the cavity between the foot and the spacer bottom;
    the connection region being attached to the building structural member; and
    the top of the spacer abutting a substrate, the spacer forming a gap between the substrate and the foam insulation board.

8. The foam insulation assembly of claim 7 wherein a fastener connects the connection region to the building structural member, the fastener passing through the connection region of the body and into the structural member.

9. The foam insulation assembly of claim 7 wherein the gap defines an air space.

10. The foam insulation assembly of claim 7 wherein the substrate is a sheathing.

11. The foam insulation assembly of claim 7 wherein the foot is fixedly connected to the body.

12. The foam insulation assembly of claim 7 wherein the structural member is one of a rafter, a joist, and a beam.

13. The foam insulation assembly of claim 7 wherein the foot protrudes laterally away from the front face of the body.

14. The foam insulation assembly of claim 7 wherein the spacer protrudes laterally away from the front face of the body.

15. The foam insulation assembly of claim 13 wherein the spacer protrudes laterally away from the front face of the body to a distance away from the body that is approximately equal to a distance that the foot protrudes away from the body.

16. The foam insulation assembly of claim 7 wherein the connection region is positioned on a part of the body that is on an opposite side of the foot from the spacer.

17. The foam insulation assembly of claim 7 wherein the connection region is an elongate extension which extends in a direction away from both the spacer and the foot.

18. A structure comprising the foam insulation assembly of claim 7.

19. The structure of claim 18 wherein the wherein the foot of the clip is fixedly connected to the body of the clip.

20. The structure of claim 18 wherein the connection region is positioned on a part of the body that is on an opposite side of the foot from the spacer.

\* \* \* \* \*